United States Patent
Messa et al.

(10) Patent No.: US 7,660,743 B1
(45) Date of Patent: Feb. 9, 2010

(54) SYSTEM FOR OPTIMIZATION OF COST MANAGEMENT

(75) Inventors: Suzette Messa, Ben Lomand, CA (US); Jay GaBany, San Jose, CA (US); Sean Handel, Moss Beach, CA (US)

(73) Assignee: Rearden Commerce, Inc., Foster City, CA (US)

(*) Notice: Subject to any disclaimer, the term of this patent is extended or adjusted under 35 U.S.C. 154(b) by 550 days.

(21) Appl. No.: 10/966,556

(22) Filed: Oct. 15, 2004

(51) Int. Cl.
G06Q 30/00 (2006.01)
G06Q 10/00 (2006.01)

(52) U.S. Cl. .......................... 705/26; 705/5

(58) Field of Classification Search ............... 705/26, 705/27, 5
See application file for complete search history.

(56) References Cited

U.S. PATENT DOCUMENTS

| | | | |
|---|---|---|---|
| 5,191,523 A | 3/1993 | Whitesage | |
| 5,319,542 A * | 6/1994 | King et al. ................ | 705/27 |
| 5,331,546 A * | 7/1994 | Webber et al. ............. | 705/6 |
| 5,475,740 A | 12/1995 | Biggs et al. | |
| 5,570,283 A * | 10/1996 | Shoolery et al. ........... | 705/5 |
| 5,655,008 A | 8/1997 | Futch et al. | |
| 5,819,092 A | 10/1998 | Ferguson et al. | |
| 5,832,451 A | 11/1998 | Flake et al. | |
| 5,839,114 A | 11/1998 | Lynch et al. | |
| 5,852,812 A | 12/1998 | Reeder | |
| 5,893,077 A | 4/1999 | Griffin | |
| 5,897,620 A | 4/1999 | Walker et al. | |
| 6,018,715 A * | 1/2000 | Lynch et al. .............. | 705/5 |
| 6,023,679 A | 2/2000 | Acebo et al. | |
| 6,195,420 B1 | 2/2001 | Tognazzini | |
| 6,230,204 B1 | 5/2001 | Fleming | |
| 6,295,521 B1 | 9/2001 | DeMarcken et al. | |
| 6,304,850 B1 | 10/2001 | Keller et al. | |
| 6,411,940 B1 | 6/2002 | Egendorf | |
| 6,442,526 B1 | 8/2002 | Vance et al. | |
| 6,477,520 B1 | 11/2002 | Malaviya et al. | |
| 6,571,213 B1 | 5/2003 | Altendahl et al. | |
| 6,622,084 B2 | 9/2003 | Cardno et al. | |
| 6,715,073 B1 | 3/2004 | An et al. | |
| 6,816,882 B1 | 11/2004 | Conner et al. | |
| 6,839,679 B1 | 1/2005 | Lynch et al. | |
| 6,847,988 B2 | 1/2005 | Toyouchi et al. | |
| 6,959,298 B1 | 10/2005 | Silverbrook et al. | |
| 6,961,773 B2 | 11/2005 | Hartman et al. | |
| 6,965,868 B1 | 11/2005 | Bednarek | |
| 6,980,885 B2 | 12/2005 | Ye et al. | |

(Continued)

FOREIGN PATENT DOCUMENTS

CA 2291463 6/2001

OTHER PUBLICATIONS

Author unknown, "Accenture and Captura Form Alliance to Provide Web-Enables Expense Management Solutions," Business Wire, Aug. 13, 2001.*
Author unknown, "Extensity, Amadeus and e-Travel Team to Provide," PR Newswire, Oct. 24, 2001.*
Aggarwal, Gautam et al., U.S. Appl. No. 11/319,911, entitled "Method and System for Ranking Services on a Variable Scale of Compliance", filed Dec. 27, 2005.

(Continued)

Primary Examiner—Amee A Shah
(74) Attorney, Agent, or Firm—Greenberg Traurig, LLP

(57) ABSTRACT

A method and system to for optimization of cost management that allows implementation of such controls and rules. In one embodiment, the system and method are integrated into an existing service procurement system.

23 Claims, 13 Drawing Sheets

U.S. PATENT DOCUMENTS

| | | | |
|---|---|---|---|
| 7,080,096 B1 | 7/2006 | Imamura | |
| 7,117,170 B1 | 10/2006 | Bennett et al. | |
| 7,136,821 B1 | 11/2006 | Kohavi et al. | |
| 7,139,728 B2 | 11/2006 | Rigole | |
| 7,222,084 B2 | 5/2007 | Archibald et al. | |
| 7,272,568 B1 | 9/2007 | Birch et al. | |
| 7,272,626 B2 | 9/2007 | Sahai et al. | |
| 7,315,824 B2 | 1/2008 | Chen et al. | |
| 7,496,520 B1 | 2/2009 | Handel et al. | |
| 2002/0010612 A1 | 1/2002 | Smith et al. | |
| 2002/0016729 A1 | 2/2002 | Breitenbach et al. | |
| 2002/0103693 A1 | 8/2002 | Bayer et al. | |
| 2002/0120478 A1 | 8/2002 | Tanaka | |
| 2002/0156687 A1* | 10/2002 | Carr et al. | 705/26 |
| 2003/0036930 A1 | 2/2003 | Matos et al. | |
| 2003/0036981 A1 | 2/2003 | Vaughan et al. | |
| 2003/0040987 A1 | 2/2003 | Hudson et al. | |
| 2003/0078800 A1 | 4/2003 | Salle et al. | |
| 2003/0105711 A1 | 6/2003 | O'Neil | |
| 2003/0110062 A1 | 6/2003 | Mogler et al. | |
| 2003/0110136 A1 | 6/2003 | Wells et al. | |
| 2003/0120477 A1* | 6/2003 | Kruk et al. | 704/2 |
| 2003/0120526 A1* | 6/2003 | Altman et al. | 705/5 |
| 2003/0182413 A1 | 9/2003 | Allen et al. | |
| 2003/0200111 A1 | 10/2003 | Damji | |
| 2003/0204474 A1 | 10/2003 | Capek et al. | |
| 2003/0229529 A1 | 12/2003 | Mui et al. | |
| 2003/0236722 A1 | 12/2003 | Kamel | |
| 2004/0044556 A1 | 3/2004 | Brady et al. | |
| 2004/0044600 A1 | 3/2004 | Chu et al. | |
| 2004/0044644 A1 | 3/2004 | Brady et al. | |
| 2004/0044673 A1 | 3/2004 | Brady et al. | |
| 2004/0044681 A1 | 3/2004 | Brady et al. | |
| 2004/0049413 A1 | 3/2004 | Momma et al. | |
| 2004/0073615 A1 | 4/2004 | Darling | |
| 2004/0117275 A1* | 6/2004 | Billera | 705/28 |
| 2004/0143498 A1 | 7/2004 | Umeda | |
| 2004/0153348 A1* | 8/2004 | Garback | 705/5 |
| 2004/0167808 A1 | 8/2004 | Fredericks et al. | |
| 2004/0193457 A1 | 9/2004 | Shogren | |
| 2004/0210487 A1 | 10/2004 | Fujimoto et al. | |
| 2004/0249684 A1 | 12/2004 | Karppinen | |
| 2004/0260601 A1 | 12/2004 | Brief | |
| 2004/0260603 A1 | 12/2004 | Marmotta | |
| 2005/0004830 A1 | 1/2005 | Rozell et al. | |
| 2005/0043996 A1 | 2/2005 | Silver | |
| 2005/0060271 A1 | 3/2005 | Vig | |
| 2005/0065821 A1 | 3/2005 | Kalies | |
| 2005/0108069 A1 | 5/2005 | Shiran et al. | |
| 2005/0119809 A1 | 6/2005 | Chen | |
| 2005/0120052 A1 | 6/2005 | Miller et al. | |
| 2005/0132006 A1 | 6/2005 | Horvitz et al. | |
| 2005/0138175 A1 | 6/2005 | Kumar et al. | |
| 2005/0165629 A1 | 7/2005 | Bruns | |
| 2005/0197915 A1 | 9/2005 | Biwer et al. | |
| 2005/0216375 A1 | 9/2005 | Grendel et al. | |
| 2005/0273345 A1 | 12/2005 | Castillejo | |
| 2005/0283389 A1 | 12/2005 | Widjaja et al. | |
| 2006/0010023 A1 | 1/2006 | Tromczynski et al. | |
| 2006/0037016 A1 | 2/2006 | Saha et al. | |
| 2006/0059021 A1* | 3/2006 | Yulman et al. | 705/4 |
| 2006/0100909 A1 | 5/2006 | Glimp et al. | |
| 2006/0101467 A1 | 5/2006 | Buco et al. | |
| 2006/0123088 A1 | 6/2006 | Simmons et al. | |
| 2006/0143087 A1 | 6/2006 | Tripp et al. | |
| 2006/0190314 A1 | 8/2006 | Hernandez | |
| 2006/0212321 A1* | 9/2006 | Vance et al. | 705/5 |
| 2006/0224423 A1 | 10/2006 | Sun et al. | |
| 2006/0241966 A1* | 10/2006 | Walker et al. | 705/1 |
| 2006/0283935 A1 | 12/2006 | Henry et al. | |
| 2007/0005406 A1 | 1/2007 | Assadian et al. | |
| 2007/0174154 A1 | 7/2007 | Roberts et al. | |
| 2007/0239548 A1 | 10/2007 | Sears | |
| 2008/0004964 A1 | 1/2008 | Messa | |
| 2008/0065408 A1 | 3/2008 | Salonen | |
| 2008/0091481 A1 | 4/2008 | Messa | |
| 2009/0006142 A1 | 1/2009 | Orttung | |

OTHER PUBLICATIONS

Billington, Corey A. et al., U.S. Appl. No. 11/093,615, entitled "Cost Method Analysis and breakdown for Cost Buildup", filed Mar. 29, 2005.

Forshaw, David et al., U.S. Appl. No. 11/324,083, entitled "Method and System to Provide Cumulative Budget and Probabilites for a Return on Expenditure for Policy Enforcement," filed Dec. 29, 2005.

Gertsbakh, Ilya et al., "Periodic transportation schedules with flexible departure time. An interactive approach based on the periodic event scheduling program and the deficit function approach," European Journal of Operational Research, Feb. 15, 1991, pp. 298-309, ScienceDirect, Nov. 3, 2008 <http://www.sciencedirect.com/science/article/B6VCT>.

Handel, Sean et al., U.S. Appl. No. 11/187,484, entitled "System and Method for Optimization of Group Shipments to Reduce Shipping Costs", filed Jul. 22, 2005.

Orttung, Mark et al., U.S. Appl. No. 11/027,115, entitled Apparatus and Method to Provide Community Pricing, filed Dec. 30, 2004.

Orttung, Mark et al., U.S. Appl. No. 11/178,033, entitled "Flexible Policy Application to Reduce Travel Costs", filed Jul. 7, 2005.

Patwardhan, Shantau et al., U.S. Appl. No. 11/066,022, entitled System and Method for Flexible Handling of Rules and Regulations in Temporary Labor Hiring, filed Feb. 24, 2005.

Website: "Tax Consequences of Frequent Flyer Mileage Earned on Business Travel", <http://www.ssbb.com/freqfly.html>, Satterlee Stephens Burke & Burke LLP, May 1997, printed Nov. 3, 2008.

Messa, Suzette et al., U.S. Appl. No. 10/966,556, entitled "System for Optimization of Cost Management", filed Oct. 15, 2004.

Transaction History of U.S. Appl. No. 10/966,556, filed Oct. 15, 2004, entitled "System for Optimization of Cost Management."

Transaction History of U.S. Appl. No. 11/027,115, filed Dec. 30, 2004, entitled "Apparatus and Method to Provide Community Pricing."

Transaction History of U.S. Appl. No. 11/066,022, filed Feb. 24, 2005, entitled "System and Method for Flexible Handling of Rules and Regulations in Temporary Labor Hiring."

Transaction History of U.S. Appl. No. 11/093,615, filed Mar. 29, 2005, entitled "Cost Model Analysis and breakdown for Cost Buildup."

Transaction History of U.S. Appl. No. 11/178,033, filed Jul. 7, 2005, entitled "Flexible Policy Application to Reduce Travel Costs."

Transaction History of U.S. Appl. No. 11/187,484, filed Jul. 22, 2005, entitled "System and Method for Optimization of Group Shipments to Reduce Shipping Costs."

Transaction History of U.S. Appl. No. 11/240,740, filed Sep. 30, 2005, entitled "Method and System for Testing of Policies to Determine Cost Savings."

Transaction History of U.S. Appl. No. 11/319,911, filed Dec. 27, 2005, entitled "Method and System for Ranking Services on a Variable Scale of Compliance."

Transaction History of U.S. Appl. No. 11/324,083, filed Dec. 29, 2005, entitled "Method and System to Provide Cumulative Budget and Probabilities for a Return on Expenditure for Policy Enforcement."

Transaction History of U.S. Appl. No. 11/480,106, filed Jun. 30, 2007, entitled "Method and Systems for Personal Restaurant Assistant."

Transaction History of U.S. Appl. No. 11/549,957, filed Oct. 16, 2006, entitled "System and Method for Automatic Review of Travel Changes and Improved Suggestions and Rules Set."

Transaction History of U.S. Appl. No. 11/768,882, filed Jun. 26, 2007, entitled "System and Method for Tracking Spending Based on Reservations and Payments."

* cited by examiner

🔗 Airlines, Sun Nov 21. Microsoft Internet Explorer
Tools  Help

🔍 Search ⭐ Favorites 🎵 Media ... ─ 500

Settings\northung\Mark's Data\Products\OldDocs\Travelprototypes\Email Demov3\Small Grapemailv1.htm ─ 501

TALARIS
Group Member Itinerary Booked For
Forrester Research Meeting
November 24, 2002
9AM - 2PM (EBT)
24 Forrester Place
Waltham, MA  02323                                      502

Patrick Grady Has booked his itinerary for the Forrester Research Meeting. Please use the buttons at the end of the email to book a similar itineray.

San Francisco (SFO) to Boston (BOS)
     Flights: American Airlines #194
Departure: Sunday, November 23 at 2:05 PM
    Arrival: Sunday, November 23 at 10:31 PM
    Seating: Economy Class, 20F Boston (BOS) to San Francisco (SFO)
     Flights: American Airlines #197
Departure: Monday, November 24 at 8:10 PM
    Arrival: Sunday, November 24 at 8:37 PM
    Seating: Economy Class, 10C                      503

Hotel: LE MERIDIEN BOSTON
            250 Franklin St, Boston, MA 02110
            1 517 451 1900 View Map
 Check-in: Sunday, November 23
Check-out: Monday, November 24

Car: Hertz
            On Airport (BOS)
   Class: Compact
  Pick-up: Sunday, November 23
511 ─  Drop-off: Monday, November 24 ─ 512    ─ 513

Book Identical Itinerary  Book Air and Hotel, Share Car  Meet at Airport, Share car
Meet at Hotel ─ 514                                      510

Thank for using Teleris. Have a great meeting.

SYSTEM FOR OPTIMIZATION OF COST MANAGEMENT

This application is related to U.S. patent application Ser. No. 10/943,608 filed on Sep. 17, 2004 and entitled "Method and System for Delegation of Travel Arrangements by a Temporary Agent", related to U.S. priority to provisional patent application No. 60/347,769 filed Jan. 9, 2002 and entitled "Automatic Services Exchange", and related to patent application Ser. No. 10/338,363 filed Jan. 7, 2003 and entitled "Automatic Services Exchange" These prior applications are incorporated herein by reference.

FIELD OF THE INVENTION

This invention relates generally to procurement of services, and more particularly to a system optimization for cost management in one embodiment.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The increasingly mobile, remote and distributed nature of today's workforce makes it difficult for an organization to provide adequate administrative support for their workers. As a result, the workers themselves must spend part of their working day identifying, procuring, managing, coordinating and accessing the services they need to perform their job. Additionally, even people who are not mobile or remote workers find that they have less time to spend in organizing the services they need for their business or personal life.

This problem is further exacerbated when many workers must attend off-site events requiring travel plans including airfare, sleeping accommodations and local transportation. The distributed nature of the workforce could result in numerous people staying in varying hotels, renting individual cars and/or transportation to and from airports and event locations. This can add up to the redundant cost of travel-related services.

Another problem is the inherent lack of knowledge between workers as to who is attending a given event, further hindering a chance for coordinated travel arrangements. Online systems such as the EVITE invitation service and the YAHOO! CALENDAR and MICROSOFT OUTLOOK scheduling services have brought together group notices of events and meetings. This has allowed workers to know who has been invited and whether they plan to attend a given event. However, such systems do not alleviate the problem of redundancy in the booking of event-related services to attend such off-site events. Organizations have an interest in reducing redundant expenses such as individual rental cars and hotel rooms. However, they often lack the bandwidth to coordinate a sharing of such services.

When people are traveling, sometimes events can require changes in the trip. Such changes may be due to outside influences, such as weather or equipment problems, or they may be due to schedule changes by another party whose plans and actions affect the schedule of the traveler(s). Such changes may then create the myriad of phone calls and confusion to address the unexpected changes.

As a result, what is further needed when changes occur during a trip, is that rather than each traveler in a group traveling together being responsible for making his own travel arrangements by himself, is a process to makes arrangements for the entire group during the travel.

SUMMARY OF THE INVENTION

Various systems and methods are described in connection with a coordination of group procurement of services. According to one aspect of the present invention, in response to an event, a first entity is automatically identified to adjust travel plans pre-established for one or more travel members. The identified first entity adjusts the pre-established travel plans for one or more members, and notifies one or more travel members of the adjustment to the pre-established travel plans. In one embodiment, the identified first entity is at least one of the one or more travel members, not one of the one or more travel members, or a software agent. In one embodiment, in response to an unavailability of the first entity, a predetermined alternative first entity is identified to adjust the pre-established travel plans. In one embodiment, in response to receiving a decline from one or more travel members, the one or more travel members are presented with one or more second travel adjustments. In one embodiment, the adjusting of the pre-established travel plans is based at least in part on a profile of one or more travel members.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 5 illustrates screen shot as it would be seen by a group member, in accordance with one embodiment.

SUMMARY

A method and system to A method and system to for optimization of cost management that allows implementation of such controls and rules. In one embodiment, the system and method are integrated into an existing service procurement system.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Automatic Service Exchange

Figure 1A:
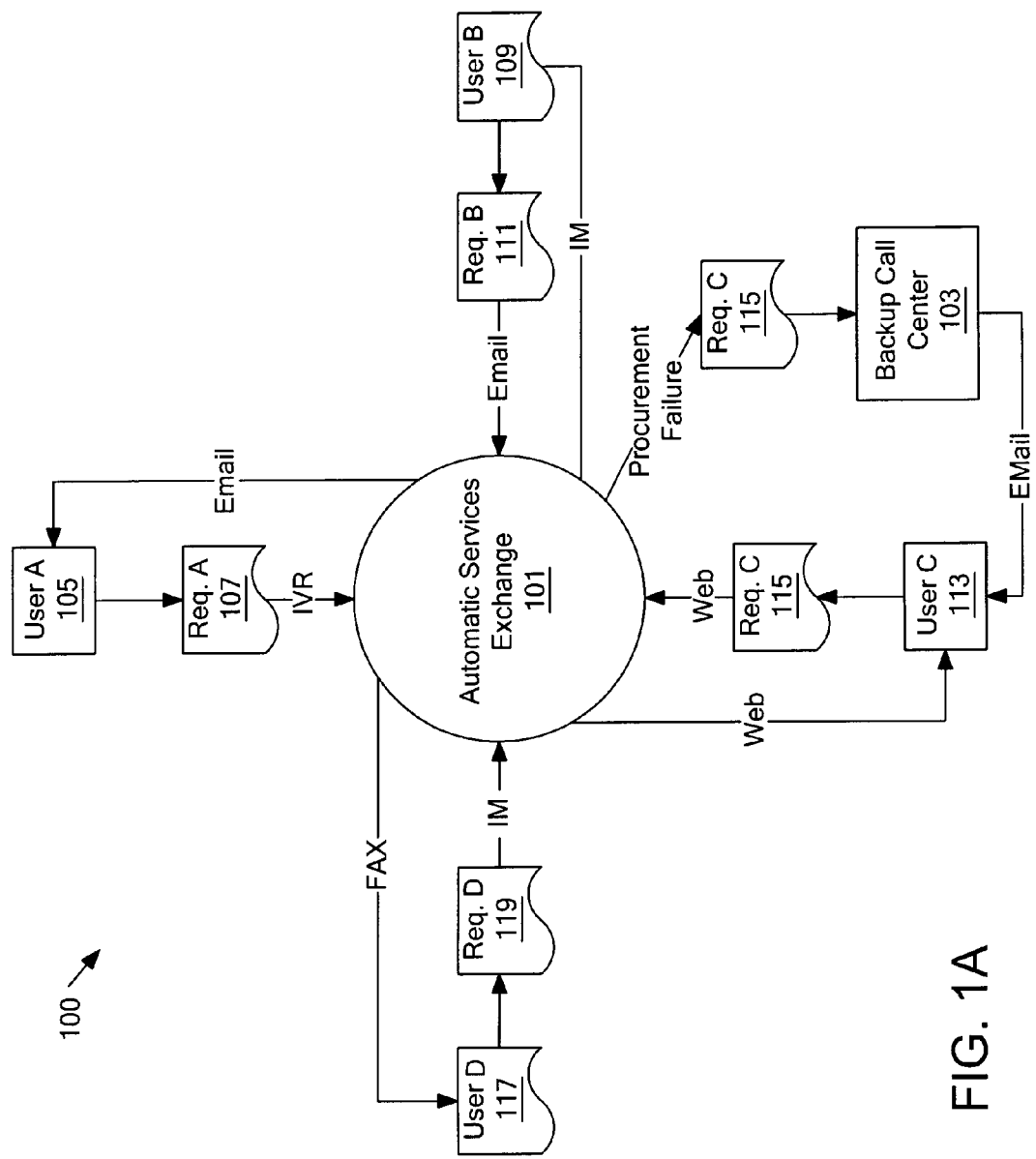
FIGS. 1A-C are diagrams illustrating a system-level overview of an embodiment of the invention.

A system level overview of the operation of one embodiment of an automatic services exchange system 100 is described by reference to FIGS. 1A-C. In FIG. 1A, the automatic services exchange system 100 is illustrated as having an automatic services exchange component 101 and an optional call center backup component 103. The automatic services exchange component 101 allows users such as a user A 105, user B 109, user C 113, and user D 117 to request services from the exchange. The service requests may be sent to the exchange component 101 through various communication media. For example, user A 105 sends its request A 107 to the exchange component 101 through an interactive voice response system (IVR), user B 109 sends its request B 111 to the exchange component 101 through e-mail (typically a structured e-mail), user C 113 sends its request C 115 via a Web browser, such as Internet Explorer or Netscape or a micro-browser on a WAP enabled cellular telephone, and user D 117 send its request D 119 through an instant messaging system (IM). These different communication media typically have different data formats, such as structured e-mail, or an Internet based markup language such as XML, or IVR voice recognition. Regardless of the communication media used to send the request to the exchange component 101, a response to a request may be sent back to the user through a different media. Thus, FIG. 1A illustrates that user A 105 receives its response through e-mail, user B 109 receives its response via instant messaging, and user D 117 receives its response via fax. In the case of user C 113, the same communication medium, Web, used to send the request is also used to send the response.

The services available through the exchange component 101 include travel services, entertainment service, personal services (e.g., haircutting), educational services, business administrative services and the like. Some services may be time critical, e.g., a dinner reservation at a particular time. The service request specifies other required criteria for the service, such as location (e.g., a certain geographic area), type, duration, quantity, price information (e.g., preferred price or price range and maximum price), etc. Additionally, a single service request may actually require services from multiple different service providers which are linked or associated. For example, if a user is planning a business trip, the request will often require services from airlines, hotels and car rental agencies and perhaps other services which are linked to or associated with the business trip.

The automatic services exchange component 101 automatically sends the service request to various service providers. In one embodiment, this transmission may be through several different electronic communication media such as structured e-mail, XML, IVR, etc. In the event that the exchange component 101 is unable to automatically procure the service requested by the user, the request is transferred to the backup call center component 103. For example, assume that request C 115 from user C 113 could not be automatically fulfilled by the exchange component 101. As illustrated in FIG. 1A, the request C 115 is sent to the backup call center 103 along with other information such as which service providers have already been contacted for the service. One of the human agents or operators at the backup call center 103 attempts to find a service provider for the request. Once the backup call center 103 determines that the request can or cannot be satisfied, it communicates the result to the corresponding user who made the request. In the example, the result is sent to user C 113 through e-mail.

Figure 1B:
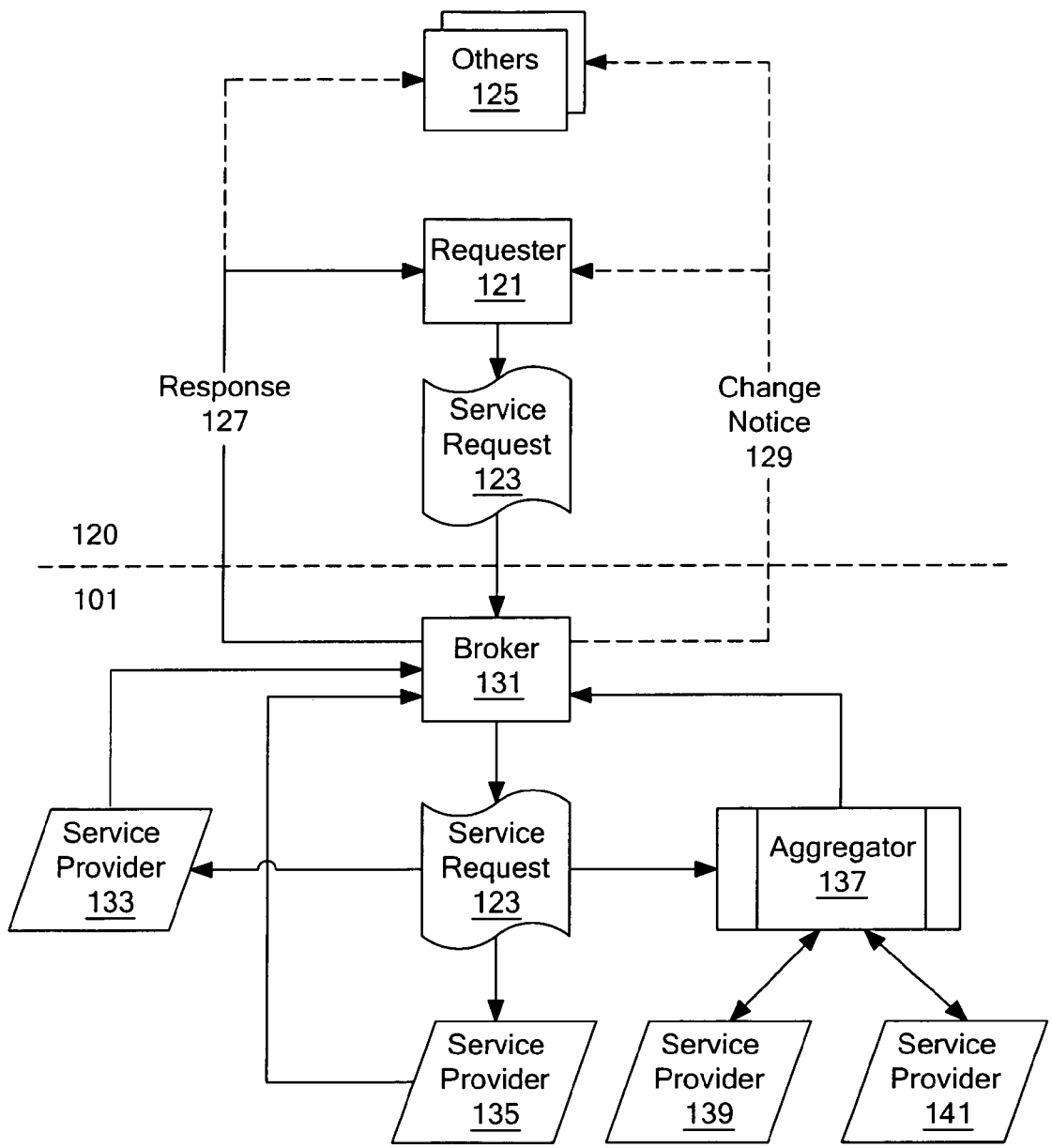
Figure 1C:
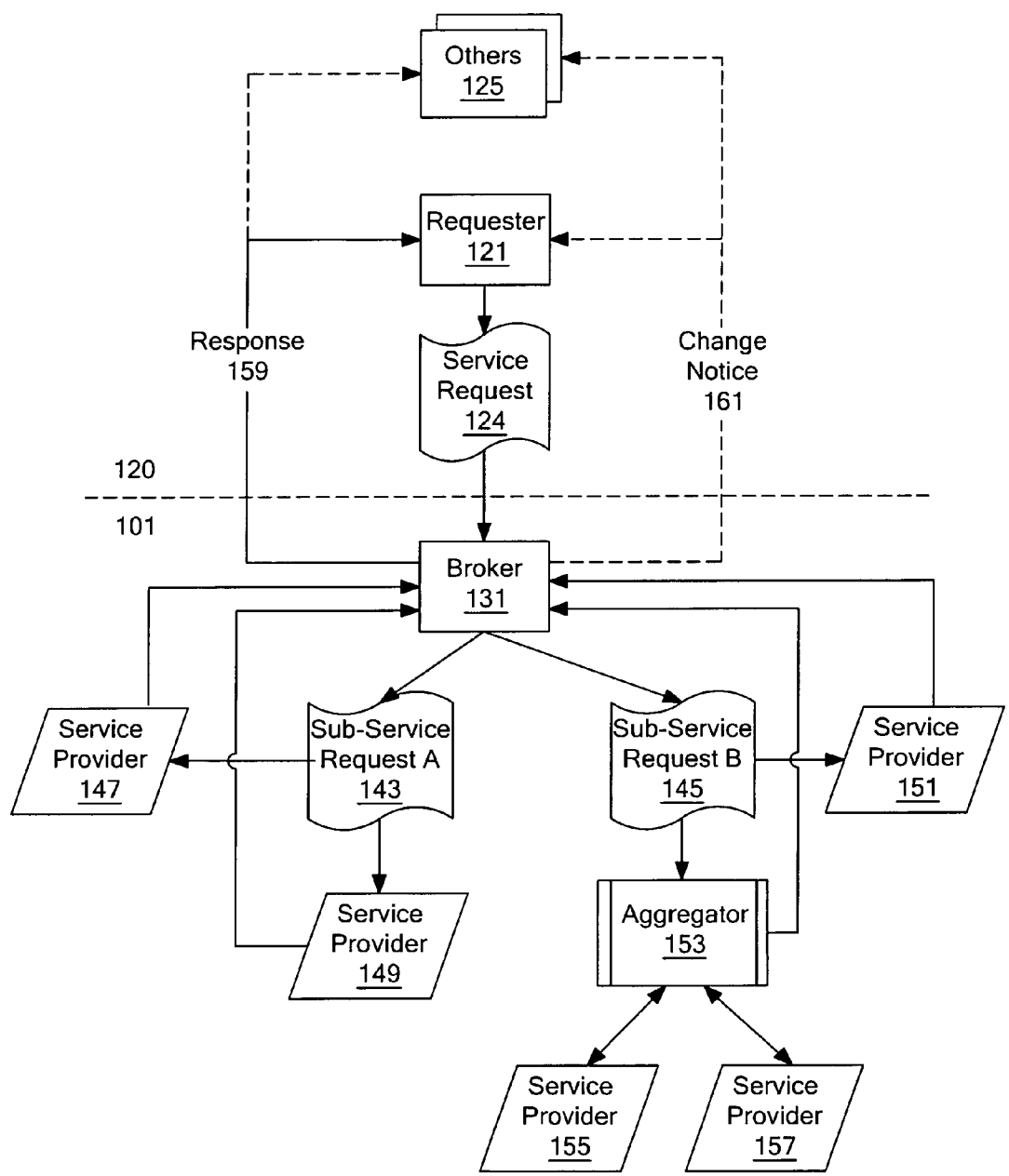

FIGS. 1B and 1C show the operation of the automatic services exchange component 101 in more detail. In FIG. 1B, a requestor 121 sends a service request 123 to the automatic services exchange 101. A broker function 131 receives a service request and passes it onto various service providers, such as service provider 133 and service provider 135. The service request may also be sent to an aggregator that represents multiple service providers, such as aggregator 137 that handles requests for service provider 139 and service provider 141, instead of directly to the service providers. In one embodiment, the service request is sent using an automatic system, such as an IVR system, that asks for a positive or negative reply to the request (e.g., a voice over the telephone says "press 1 if you have a table for two at 6:30 p.m. at your restaurant on XYZ date, press 2 if you do not"). Each of the service providers 133, 135 and the aggregator 137 replies to the broker 131 indicating whether they are able to provide the requested service. The responses to broker 131 may be through different communication media such as the Internet (e.g., via an XML page), structured e-mail, or IVR.

Assuming there is at least one positive reply, the broker 131 sends a response 127 to the requestor 121 with the results indicating at least one response matched the request. Depending on parameters set by the requestor 121, if multiple positive replies are received by the broker 131, the broker may choose the best match based on the required or predetermined criteria or it may send responses for all the positive replies to the requestor 121 for selection. The requestor 121 may also authorize the broker 131 to contract for the service under certain circumstances without waiting for approval from the requestor 121. A match to request typically means that the response from the service provider is within the range of acceptable requesting parameters such as time of service, location of service, price of service, level (e.g., quality requested) of service, and other parameters specified by the request.

As illustrated in phantom in FIG. 1B, the broker 131 may also send the response 127 to others 125 specified by the requestor 121. For example, when multiple people are planning a dinner, one person, the requester 121, may be in charge of obtaining the reservation, but the other people involved should receive notification of the particulars.

Also shown in phantom in FIG. 1B, is the capability of sending a change notice 129 to the requestor 121 if a procured service changes before its performance date. This change may occur by a modified request which is issued by the requestor 121. Similarly, the change notice 129 may also be sent to others 125 specified by the requestor 121. The requester can approve the change if the change is satisfactory, or submit a new service request if the change is unsatisfactory, or if the service is now unavailable from the original provider (not shown). The exchange system of the invention, in one embodiment, can automatically respond to a modified request.

The broker 131 reviews, through an automatic machine implemented process, the service requests to determine if the service request is actually a request for multiple services, such as multiple services which are linked or associated such as those associated with an event (e.g., a business trip which requires airline tickets, rental car reservation and hotel reservation). The resulting operation is illustrated in FIG. 1C. The broker 131 breaks such a request into sub-service requests 143 and 145 and sends each to the appropriate service providers. Thus, in FIG. 1C, sub-service request A 143 is sent to service providers 147, 149, while sub-service request B 145 is sent to service provider 151 and aggregator 153, which aggregates the services from service providers 155 and 157. As before, each service provider/aggregator typically returns a message to the broker 131 specifying its ability to provide the service. Each sub-service response 159 may be sent separately to the requestor 121 or the broker 131 may wait until all service providers/aggregators have responded or until a match to each sub-service request has been found. As in FIG. 1C, change notices 161 also will be sent to the user 121 upon a change in a procured service. Additionally, the responses 159 and the change notices 161 may be sent to others 125 specified by the requester 121.

The particular methods of the invention are now described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (e.g., the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
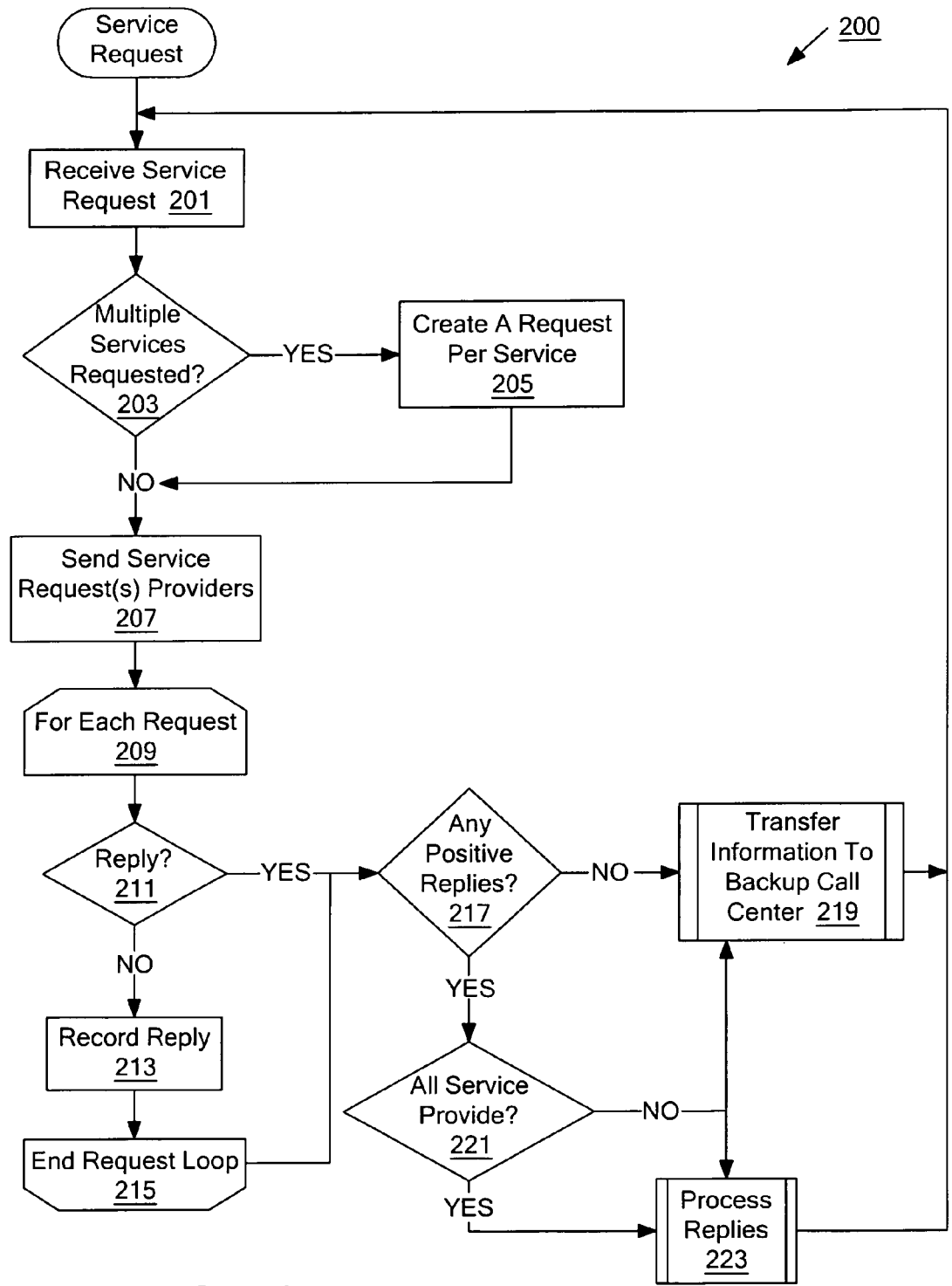
FIGS. 2A-C are flowcharts of methods to be performed typically by computers in executing the embodiment of the invention illustrated in FIGS. 1A-C.
Figure 2B:
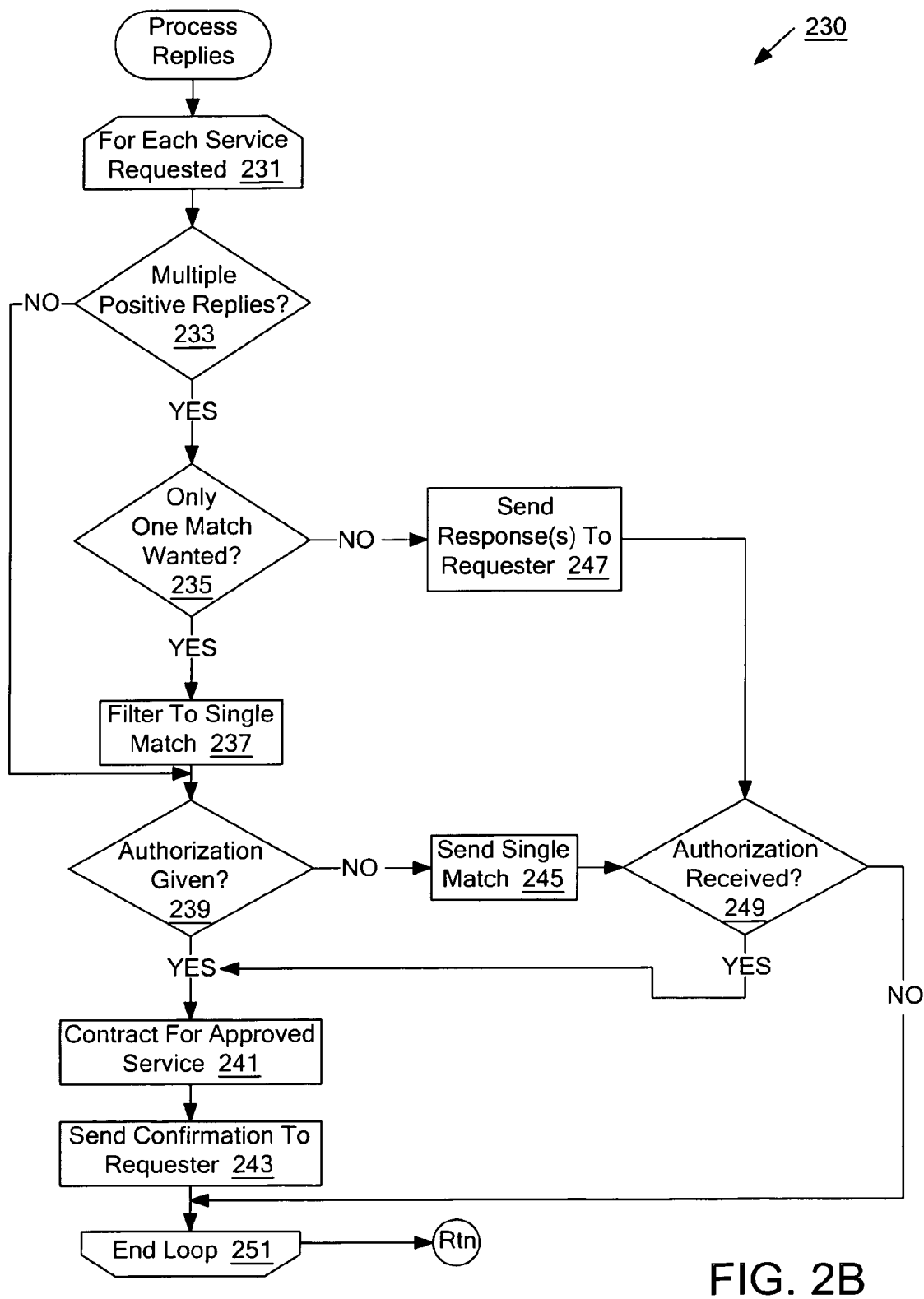
Figure 2C:
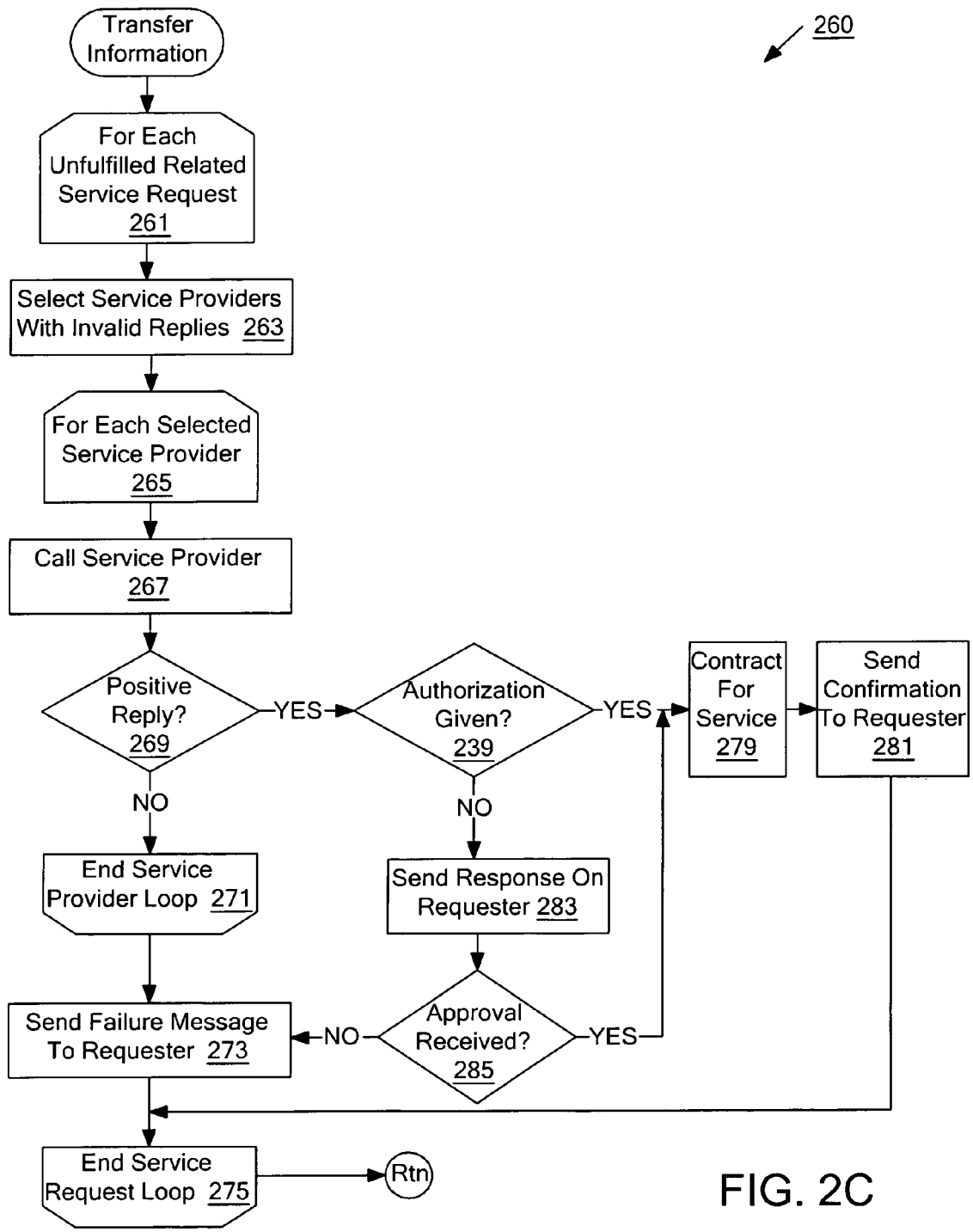
Figure 3:
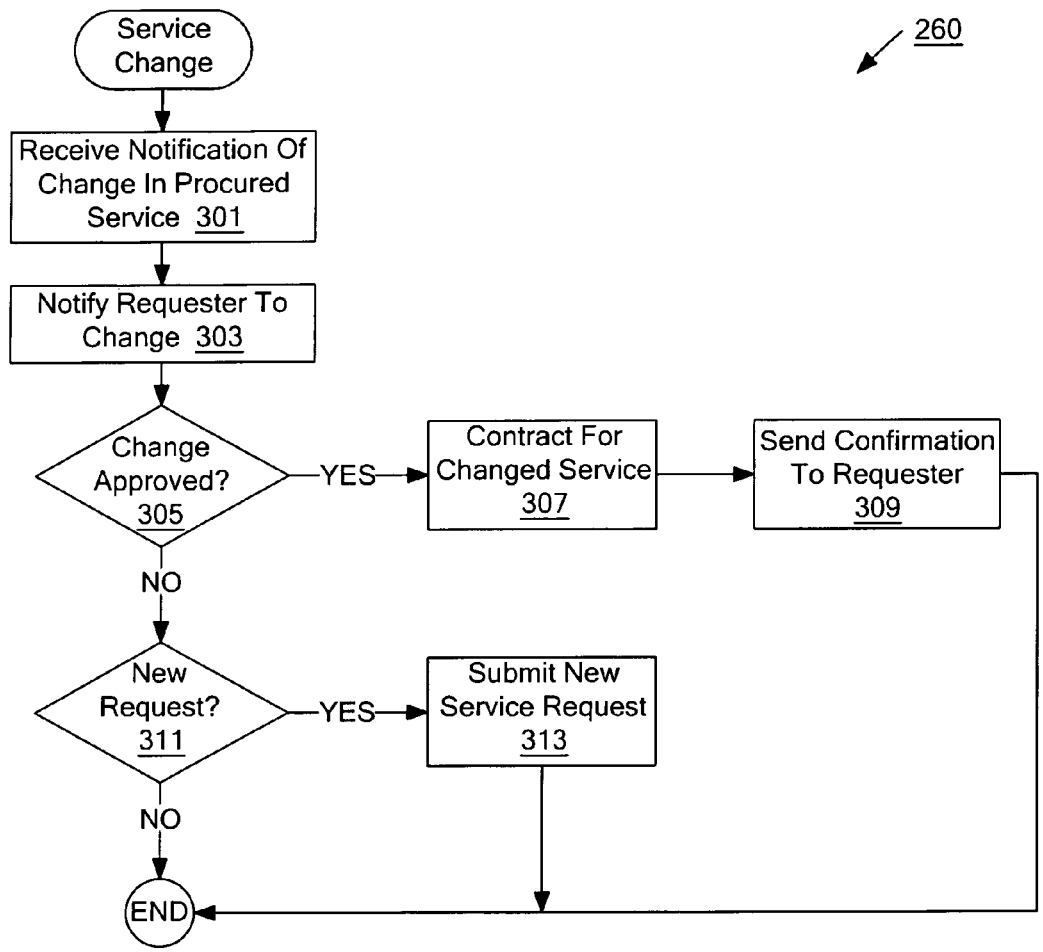
FIG. 3 is a flowchart of an optional method to be performed by a computer in executing the embodiment of the invention illustrated in FIGS. 1A-C.

FIGS. 2A and 2B illustrate the acts to be performed by a computer, or set of computers, acting as the automatic services exchange component 101 of FIG. 1A in processing service requests. FIG. 2C illustrates the acts to be performed by a computer acting in conjunction with the backup call center 103 in FIG. 1A. FIG. 3 illustrates the acts to be performed by the computer acting as the automatic services exchange component when the optional change notification is desired.

Referring first to FIG. 2A, a service request method 200 receives a service request method (block 201) and examines it to determine if there are multiple, related services requested (block 203). If so, the service request method 200 creates a request for each service (block 205). Once the multiple requests are created, or if there is only one request, the service requests are sent to the appropriate providers (including aggregators) for the services (block 207).

The service request method 200 processes the replies for each request separately as illustrated by request loop starting at block 209. It will be appreciated that multiple request loops may be running concurrently. The requestor may specify a time which is associated with a deadline for completion of a search for a match to a request. In one embodiment, the requestor specifies a predetermined required period of time (time out period or deadline) within which replies must be received or by which time the requestor should be contacted by the exchange to inform the requestor of the incomplete status of a request. In another embodiment, the time out period is determined by the method 200 based on time criteria specified in the request. The request loop waits at block 209 until an incoming reply is received or until the time out period expires. When the request loop is activated by an incoming reply (block 211), the reply is recorded at block 213. If all replies have not yet been received, the request loop returns to its wait state. If all replies have been received, the particular request loop ends (block 215) and the method 200 proceeds to block 217 to evaluate the replies. Alternatively, if the time out period expires before any or all replies are received, the method 200 also proceeds to block 217. The time out period can provide the exchange system with some time to attempt to "manually" (through the intervention of a human operator) procure the service with enough time before the service is actually required. If the user/requestor fails to specify a time out period, the exchange system may specify a default time out period which is at least several hours before the requested time of the service (e.g., a 4:30 p.m. time out for a dinner reservation at 7:30 p.m.) or at least one day before the requested date of the service. Further, this time out period also allows the requestor to be notified of a failure to procure a service before the time requested for the service so that the requestor can take appropriate actions.

At block 217, the method 200 determines if any positive replies were received. If not, the corresponding request is transferred to the backup call center (which includes human operators) for processing along with all replies (block 219) so the backup call center knows the current status of the request (e.g., who has replied to the request, who has not, etc.). The processing represented by block 219 is described in more detail in conjunction with FIG. 2C further below.

If multiple services were requested, the method 200 determines if at least one service provider has replied positively to each service request (block 221). Requests that cannot been procured are sent to the backup call center at block 219, while positive replies are processed at block 223 (e.g., by sending out confirmations to the requester and the service providers to secure the providing of the service). Similarly, if only one service was requested and at least one reply is positive, the method 200 proceeds to block 223 to process the reply. The processing represented by block 223 is described next.

One embodiment of a process reply method 230 is illustrated in FIG. 2B. It will be appreciated that multiple instances of the method 230 may be executing simultaneously based on the number of service requests that were made. For each service requested (block 231), the process reply method 230 determines if multiple positive replies for a service were received (block 233). If so, but only one match has been requested (block 235), the method 230 filters the replies to find a single match that best satisfies the criteria specified by the requestor (or specified as defaults by the system of the exchange service) (block 237). If there was only one positive reply for the service, or once a single reply has been filtered out in block 237, the method 230 determines if the requestor has authorized the automatic services exchange system to automatically procure the service (block 239). If so, the method 230 contracts or otherwise reserves the service from the corresponding service provider (block 241) and sends a confirmation request confirmation to the requestor that the service has been procured (block 243). In these situations where the service provider requires a commitment (e.g., a down payment or a deposit) from the requestor, the automatic services exchange provides payment information (e.g., credit card name, number and expiration date) previously provided by the requestor to the automatic services exchange or requests that this information be provided by the requester to either the exchange (so it can be forwarded to the service provider) or to the service provider directly. If, however, there is no authorization (block 239), the information in the reply is sent to the requestor at block 245 and the method 230 waits to receive approval from the requestor. If approval is received (block 249), the method 230 contracts for or otherwise reserves the approved service and sends a confirmation as previously described. However, if approval of the particular service is not received from the requestor, the service request is terminated.

If more than one match is wanted at block 235 (as specified by a predetermined preference sent by the requester or as set as a default by a system of the exchange service), a response containing all positive replies is sent to the requester for selection (block 247) and the method 230 waits to receive approval of one of the providers at block 249. As in the case of a single reply, the method 230 contracts for or otherwise reserves the service from the approved provider at block 241 and returns a confirmation message at block 243, or the request is terminated if no approval is received.

Turning now to FIG. 2C, one embodiment of an information transfer method 260 for a backup call center is illustrated. When the service request is sent to the providers through an automatic system, a reply may be invalid such as when a person, in response to questions from an IVR system, presses an incorrect digit on a telephone key pad or hangs up without replying or if the call is unanswered. For each unfulfilled related service request (block 261), the method 260 selects those service providers that gave invalid replies (block 263). Each of the selected service providers (block 265) will be called by a human agent (block 267) until one provider is able to provide the service (block 269) or until all have been called (block 271). If no service provider can fulfill the service request, the method 260 sends a failure message to the requester at block 273. If there are no further related service requests (block 251), the method 260 terminates.

The first positive reply at block 269 causes the method 260 to determine if the requester has authorized the automatic services exchange system to automatically procure the service (block 277). If so, the method 260 contracts or otherwise reserves the service from the corresponding service provider (block 279) and sends a confirmation request confirmation to the requester that the service has been procured (block 281). If, however, there is no authorization at block 277, the information in the reply is sent to the requestor (block 283) and the method 260 waits to receive approval from the requestor. If approval is received (block 285), the method 260 contracts for or otherwise reserves the approved service and sends a confirmation as previously described. However, if approval of the particular service is not received from the requester, a failure message is sent to the requester at block 272.

As described previously, the automatic services exchange system optionally can send change notices to the requester to alert him/her of changes in a procured service or receive a modified request from the requester even after the services have been procured. One embodiment of a service change method 300 that communicates changes is illustrated in FIG. 3. When the method 300 receives notification of a change in a procured service (block 301), it notifies the requester and asks if the requester approves the change or wishes to submit a new service request (block 303). If the change is approved (block 305), a message is sent to the service provider to contract for the changed service (block 307) and the change is confirmed to the requester (block 309). If the change is not approved but a new service request is submitted (block 311), the new request is resubmitted into the automatic services exchange system at block 313.

The particular methods performed by computers acting as the automatic services exchange and backup call center components for one embodiment of the invention have been described with reference to flowcharts in FIGS. 2A-C and 3, including all the acts from 201 until 223, from 231 until 251, from 261 until 285, and 301 until 313, respectively. It will be appreciated that more or fewer processes may be incorporated into the methods illustrated in FIGS. 2A-C and 3 without departing from the scope of the invention and that no particular order is implied by the arrangement of blocks shown and described herein and that alternative orders of the operations are within the scope of the invention.

Figure 4A:
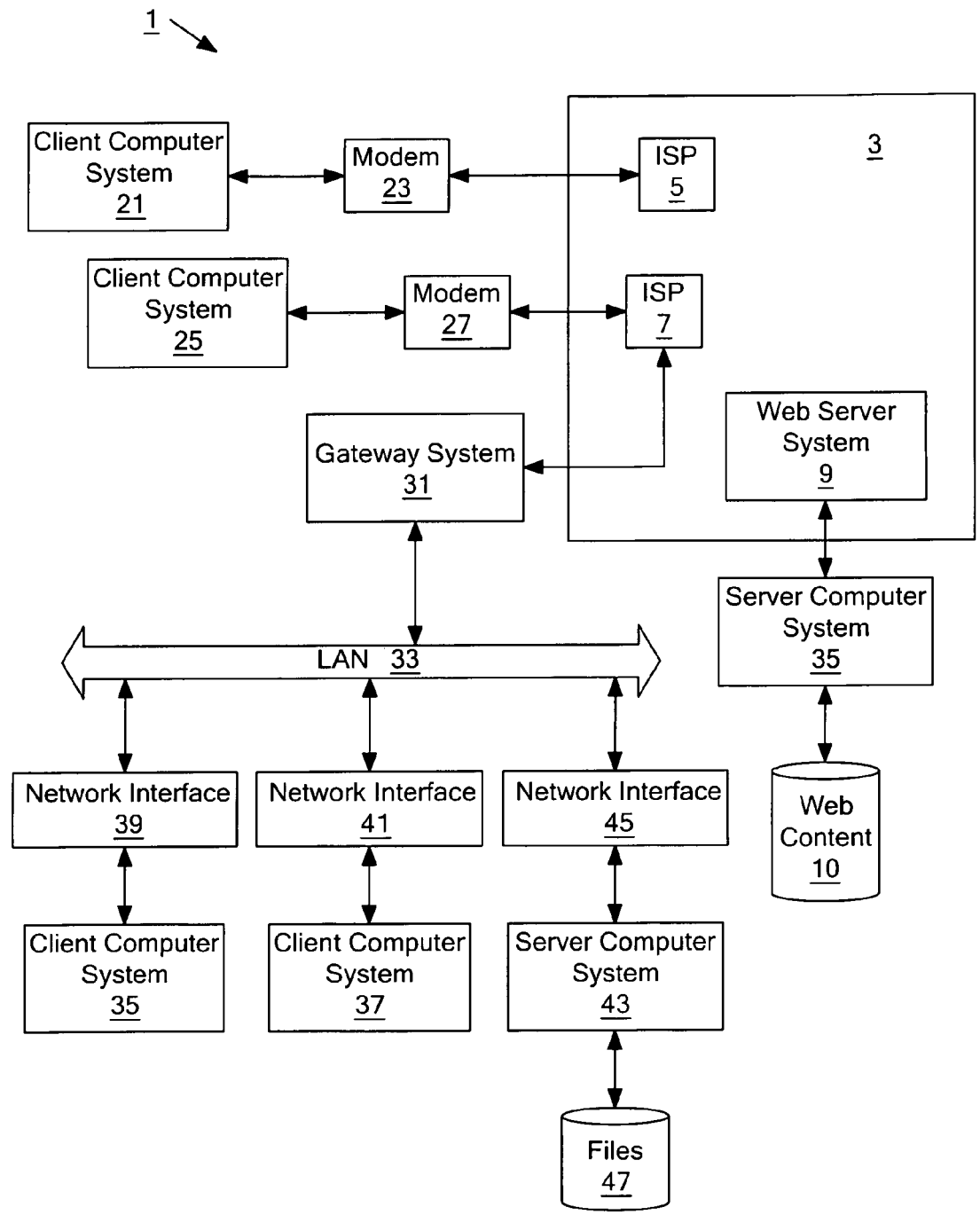
FIG. 4A is a diagram of one embodiment of an operating environment suitable for practicing the present invention.
Figure 4B:
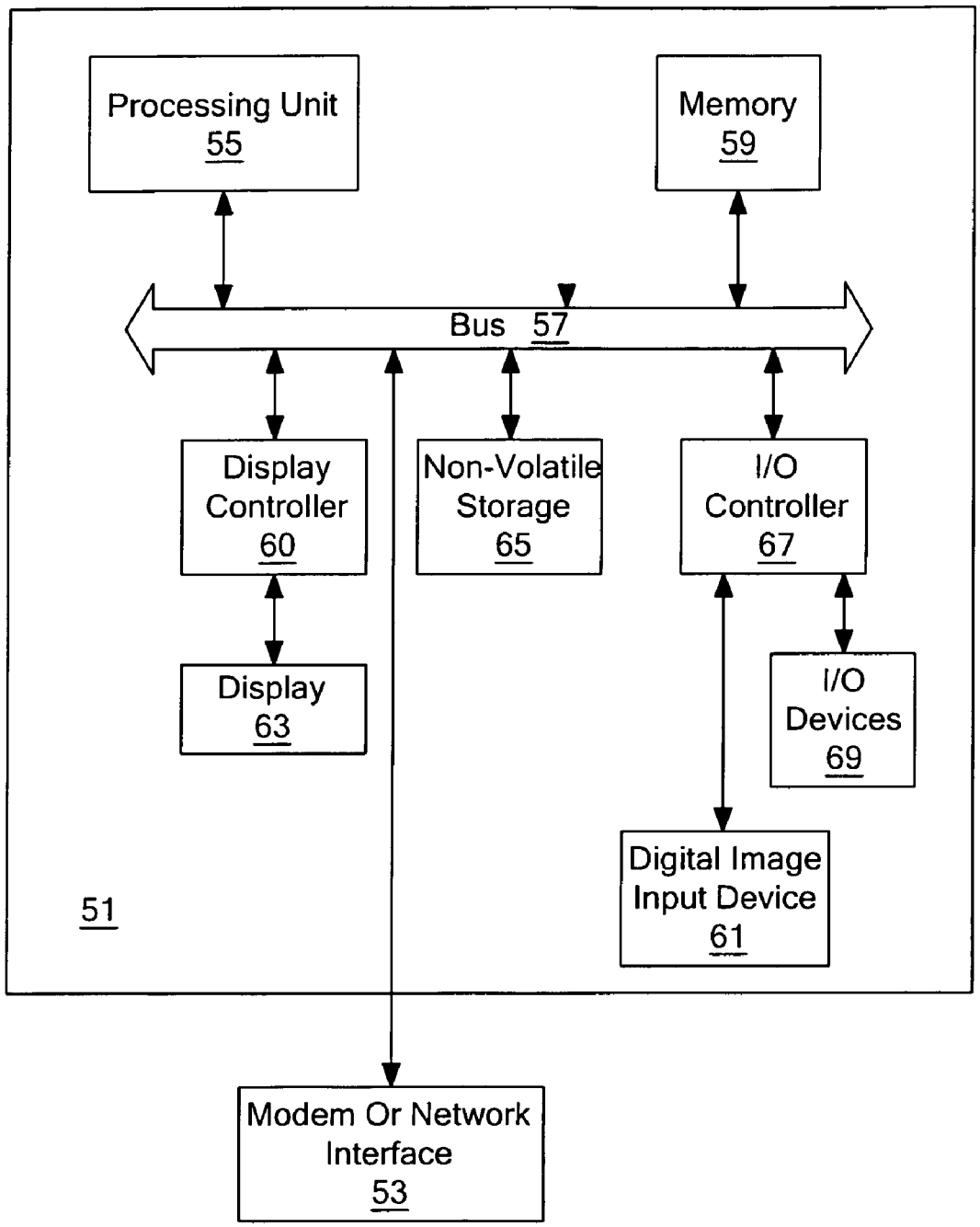
FIG. 4B is a diagram of one embodiment of a computer system suitable for use in the operating environment of FIG. 4A.

The following description of FIGS. 4A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices (e.g., PDAs—personal digital assistants such as a Palm Pilot; or cell phones, etc.), multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7, through either physical or wireless interfaces. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g., "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g., "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SIL~M). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 61 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention.

Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor. Further, mobile devices, such as PDAs, browsing web phones etc. and their respective supporting infrastructure may also be used as clients etc.

It will also be appreciated that the computer system 51 is controlled by operating system software which includes a file management system, such as a disk operating system, which is part of the operating system software. One example of an operating system software with its associated file management system software is the WINDOWS family of operating systems from Microsoft Corporation of Redmond, Wash., and their storage 65 and causes the processor 55 to execute the various acts required by the operating system to input and output data and to store data in memory, including storing files on the non-volatile storage 65.

Coordination For Group Procurement of Services

One embodiment of the present invention permits group members to add additional reservations onto an existing reservation of a group leader, supervisor or any other member of the group in such a manner as to synchronize travel plans and coordinate locations, etc., both in terms of travel time, sharing rides, staying at the same hotel, tee times, and other services one may desire when attending an event. But rather than book all group members at once, individual group members may make plans separately, to accommodate instances in which group members are, for example, traveling from different locations, or are arriving at different times, etc. For example, a sales person may be coming from a different customer site in another city, while the marketing person and the technical person may be coming from the home office.

FIG. 5 shows a screen as it would be seen by such a group member. The data as displayed on the screen may be shared with the group members via an Internet media, or other alternative media. Section 500 is the header bar of the browser window, and section 501 is the application window for a specific set of services—in this case, travel and accommodations for a business meeting at a customer site. Heading section 502 for the event shows that members of the company Talaris are visiting Forrester Research in Waltham, Mass. Group members can see the travel itinerary of the group leader respectively the first person to book travel in section 503. As each member books travel and other services related to the meeting, the system automatically notifies, via the Internet or other media, the other members of the group and asks if they want to book identical travel services or similar travel services (e.g., start in a different location and ultimately end up at a destination together at a specific time). The system automatically would also coordinate sharing of resources such as a rental car or hotel rooms. Further, the system would enforce corporate policies related to the services being procured. For example, the system might require employees to share a rental car, a limo, a shuttle bus etc. if two or more employees are traveling on a similar trip.

Thus in the example embodiment shown in FIG. 5, group members have the options shown in section 510 to choose one of four travel options. It is clear that in other example embodiments, other, similar options, additional options, or fewer options may be offered. Section 511 is an option to book an identical itinerary, which would be suitable for a person starting the trip from the same location at the same time. This option allows group members to travel together. Section 512 allows group members to book separate, identical air and hotel reservations, but has them share a single car rental; section 513 allows members to meet at the airport upon arrival (in this example, at the Boston airport) so a group member flying in from, for example, New York, could meet with members flying in from San Francisco, to share the car into Walton; and section 514 allows for only booking rooms at the same hotel, so group members may come and go separately but stay at the same hotel, allowing them to meet and travel together to the company site conveniently.

The system illustrated in FIG. 5 is just one embodiment of the novel art of this disclosure for automated coordination of services procurement for a group of individuals involved in a common goal or event. In this and other embodiments, one of the individuals (the leader) would define the attributes of the event and specify the other individuals to be involved in the event (the "group"). All of the individuals would be automatically notified, via the Internet or other media, by the system that they are invited to participate in the goal or event, and all individuals would be able to accept or decline membership in the group event or goal, in some cases in accordance with company policies for such participation, expense rules, privacy rules etc. Likewise, all individuals who accept group membership would be able to procure a combination of services required to execute the event. All individuals who accepted the invitation to join the group would be notified of the booking of services by the other members of the group, and each individual in the group would be able to make a services procurement request for the services procured by any other individual or individual(s) in the group. The system is able to coordinate sharing of the services based on its understanding of the mutual requirements of the group, and is also able to adjust the services procured by members of the group to better meet the overall group's objectives. The system is likewise able to adjust the services procured by the members to optimize the use of the services by the group as a whole, or to intelligently cancel services based on changes in requirements input by one or more members of the group. In some cases, corporate policy may allow some participants to exceed their usual settings in context of a group event. In other cases, it may notify additionally their supervisor, procurement group, or human resources, and in yet other cases, it may require a confirmation by e-mail from a supervisor or similar. The type of services that may be procured are not limited to services related to travel, but rather may also include other services related to attending an event, or other activities to participate in while visiting a location.

Yet in some cases, if a member needs to come in late, for example due to a previous meeting, he may not share in some aspects, such as the share car ride for example etc. In other circumstances, if a member needs special facilities, not available at the hotel/car/flight chosen for the group, the member may break out of the group arrangements. This may be on a case by case basis, with approval and or notification of the group leader, his supervisor etc., or may be pre-defined in the member's profile in some cases.

Figure 6:
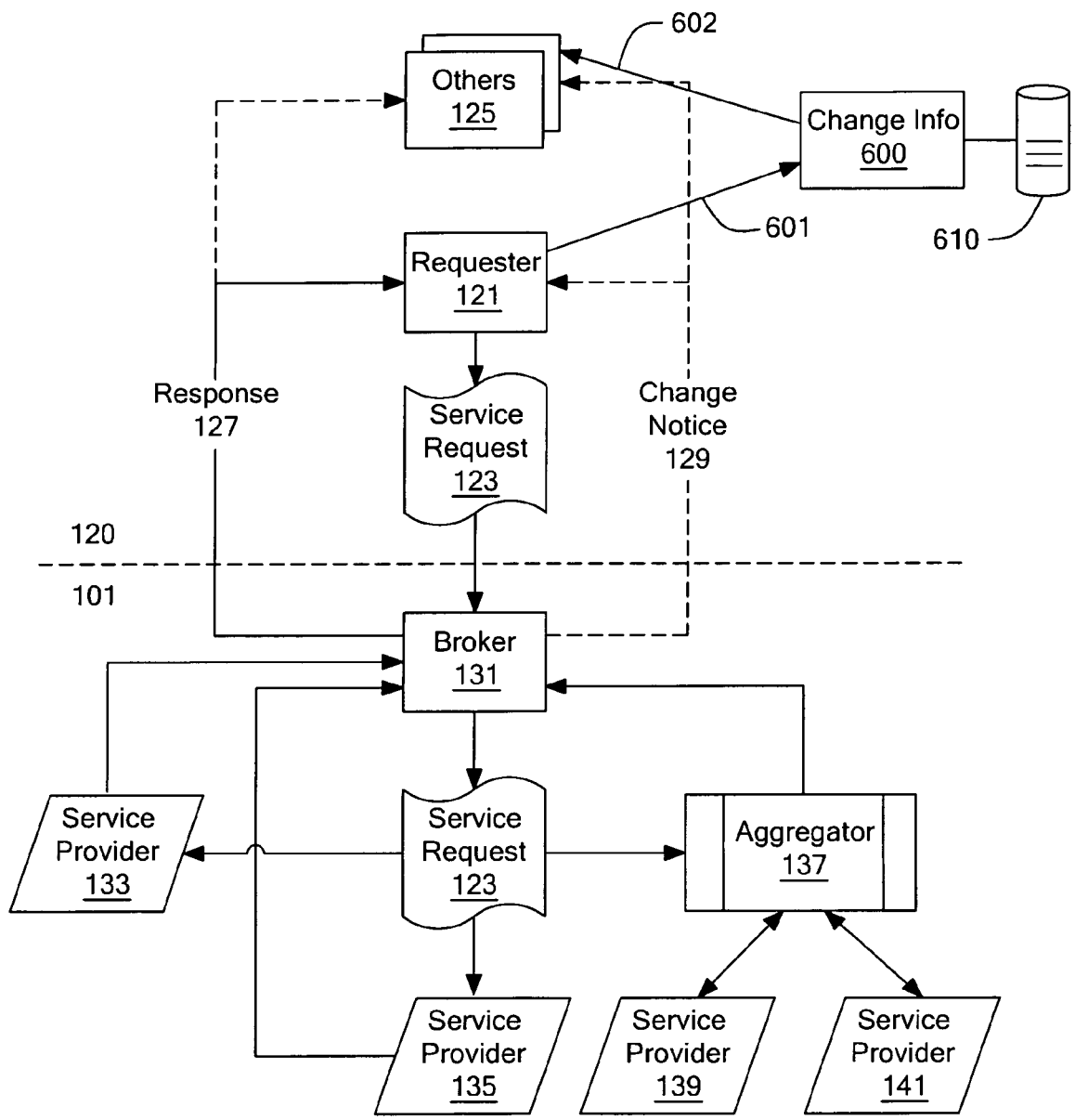
FIG. 6 illustrates block diagram of an alternative embodiment.

FIG. 6 illustrates a block diagram of an integration of the embodiment for providing coordination of group procurement of services integrated in the system of FIG. 1b, as discussed above. The integration includes the addition of a group information block 600 that allows the original requester 121 to export his travel plans via function 601 into block 600. The requester can assign group members into a group data base 610, so that when the designated group members log in as other users 125, they can see what travel options are available, pull them down via function 602, and then participate in making travel plans, as described above in relation to FIG. 5. Furthermore, as mentioned above, group member may receive a particular invitation, and in some cases, that may require a supervisor's approval.

In yet other cases, a user may be able to forward their service request in an automatic fashion. For example, a user could initiate a group by inviting others to join for a meeting at a specific date, time, and location. Once they have done this, they have formed a group. Once one member of the group has booked their travel for this particular meeting, they would be prompted to see if they are willing to share their itinerary with the other members of the group. If they give permission for the other members to see the itinerary, all other members of the group would be automatically notified by the system. When notified, the other members of the group would be given options to book similar or identical services. When other group members select an option, a service request such as (123) in FIG. 6 is automatically generated and sent to the services exchange.

Automated Trip Planner

In a service procurement platform system, enhanced procurement procedures may be desired. In fact, very often large corporations have a rigorous set of procurement rules that must be followed. These rules may apply to both approval and authorization processes as well as which types of services and which providers are qualified for use. However, persons responsible for approving a service or reservation request do not always have access to all the information they need to make an approval decision. In addition, each approver may want different pieces of information based on some criteria that they determine. Further, there may be volume management contracts that must be monitored and met according to certain rules and contracts that the enterprise may have.

One embodiment of the present invention provides system and method for optimization of cost management that allows implementation of such controls and rules. Further, the system and method, in one embodiment, are integrated into an existing service procurement system.

Figure 7:
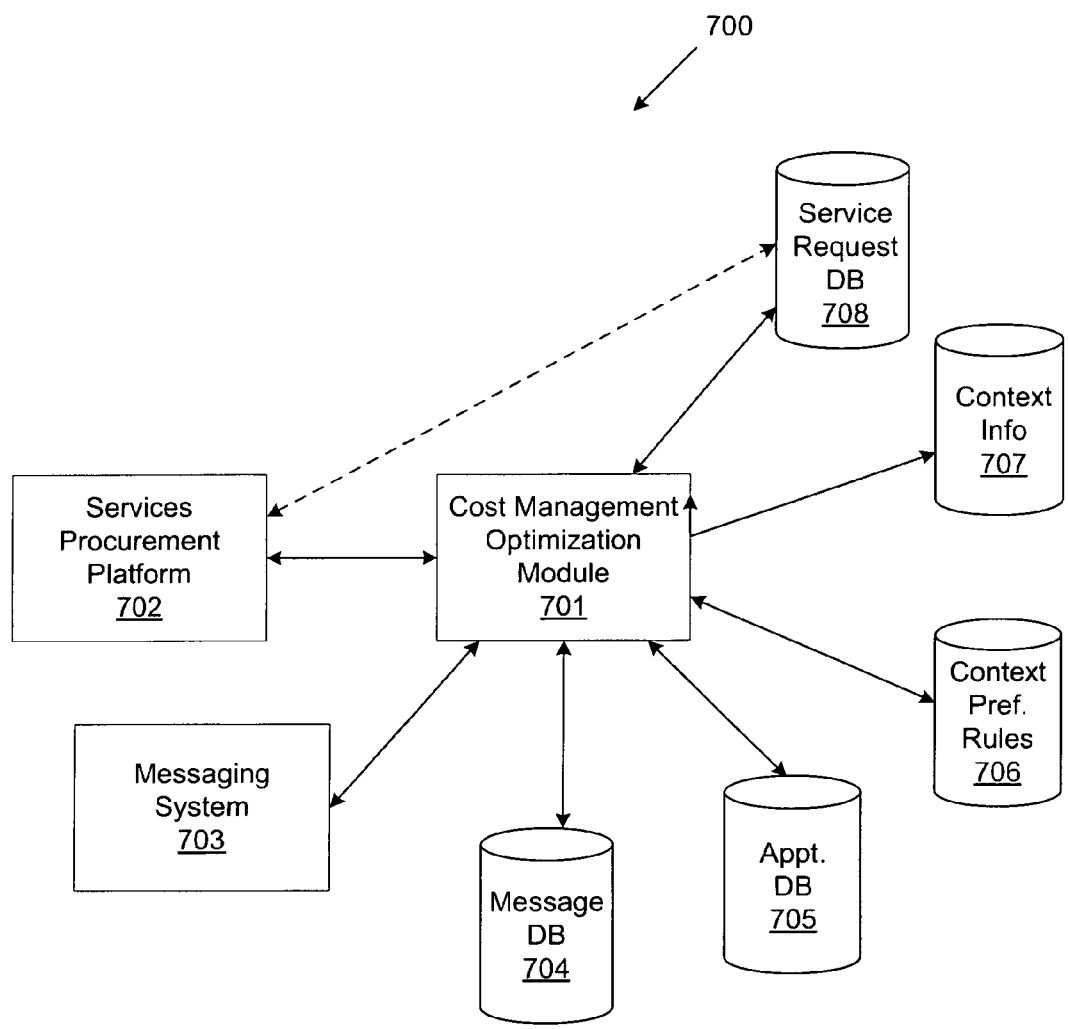
FIG. 7 illustrates a diagram of a system for cost management and optimization, according to the one embodiment.

FIG. 7 illustrates a diagram of system 700 for cost management and optimization, according to the novel art of this disclosure. Cost management optimization (CMO) module 701 may be an independent module, or running under or together with a services procurement platform 702.

In one embodiment, Messaging system 703 may be a separate messaging system or it may in some cases be integrated with services procurement platform 702. In service procurement processes there are typically a number of occasions where the procurement system needs to advise a user of important information either based on who they are or the service they are procuring. Rules-based messaging according to one embodiment would be based on user and service attributes. The system would provide the ability to create rules that would display a message(s) based on some attribute of the procurement. These attributes could be based on the user, service destination, time, price, etc. For example, if the user is traveling to Denver and staying at the Wyndham Hotel during a particular time, the system would advise the user that the Wyndham is providing free shuttle service to the company facility during this time. The system may also be used to message the user about special deals, company activities, etc. Another example is putting a "Decline Insurance" message in car rental calendar and notification. Additionally, messaging could be place name and date/time-sensitive. For example, if booking a car at location x between two dates, the system would show a certain message.

Service requests are stored by the services procurement platform in database 708. They are processed by the CMO module 701 according to several sets of rules and information stored in context information module 707, which provides information according to which context decisions can be made in general. Examples of contextual information include vendor utilization information, employee history, and options declined by user.

Context preference rules module 706 can store the context preferences of certain approvers, as well as the corporate rules. One example of such rules may be that the system automatically authorize expenditures for certain procurements up to certain amounts. In another example, there is a contract for 500 nights with Marriott and 500 nights with Hilton, and the current balance is 100 nights with Hilton and 350 nights with Marriott. Therefore, in one embodiment, information is provided to approvers that Hilton should be given preference for hotel service requests, because the fulfillment of their contract lags further behind than does that of Marriott.

In one embodiment, the system may allow the approver to determine what contextual information they would want based on the request. For example, if the user is requesting approval for a hotel that exceeds the per diem rate, the approver could view the current hotel vendor utilization, employee history of similar requests, the options declined by the user, average hotel rates in the area, cost of other employees hotels in that city in the last week/month/year, etc.

Other similar kinds of contract-based rules and preferences may exist for transportation, conference services, communication, courier services, etc. For example, in shipping, the address of the actual delivery point could be validated and, if necessary, an alternative correct address could be suggested to the user, which may result in cost savings, as many courier services charge a fee for incorrect/incomplete addresses. Additionally, service types for various services, such as package shipping, hotels, etc. could be standardized. The list set forth is only exemplary and is not to be construed as a limitation. Conditional policies may be based on custom fields that the user enters. For example, a company may define "building" or "mailstop" to be custom fields—policy applies for certain values. Settings preferred by other companies may be shown, for example, "95% of other Fortune 500 companies use this setting." When implementing a new customer onto a system, the customer must make a number of decisions on how the settings/policies should be configured. If each setting/policy provided a high-level overview of how other customers had implemented the setting/policy, it would provide the customer with important data to assist them in the decision-making process. For example, the setting/policy could say "95% of other fortune 500 companies use this policy setting."

Once that information has been processed, the approval goes into database 705, which then lets the services procurement platform 702 execute or finalize contracts, reservations, and other service procurements.

In one embodiment, for all types of messages, a local database 704 may be used, or that service may be requested from the messaging system 703. Alternatively, as mentioned above, the message service and database may be provided by services platform 702.

Figure 8:
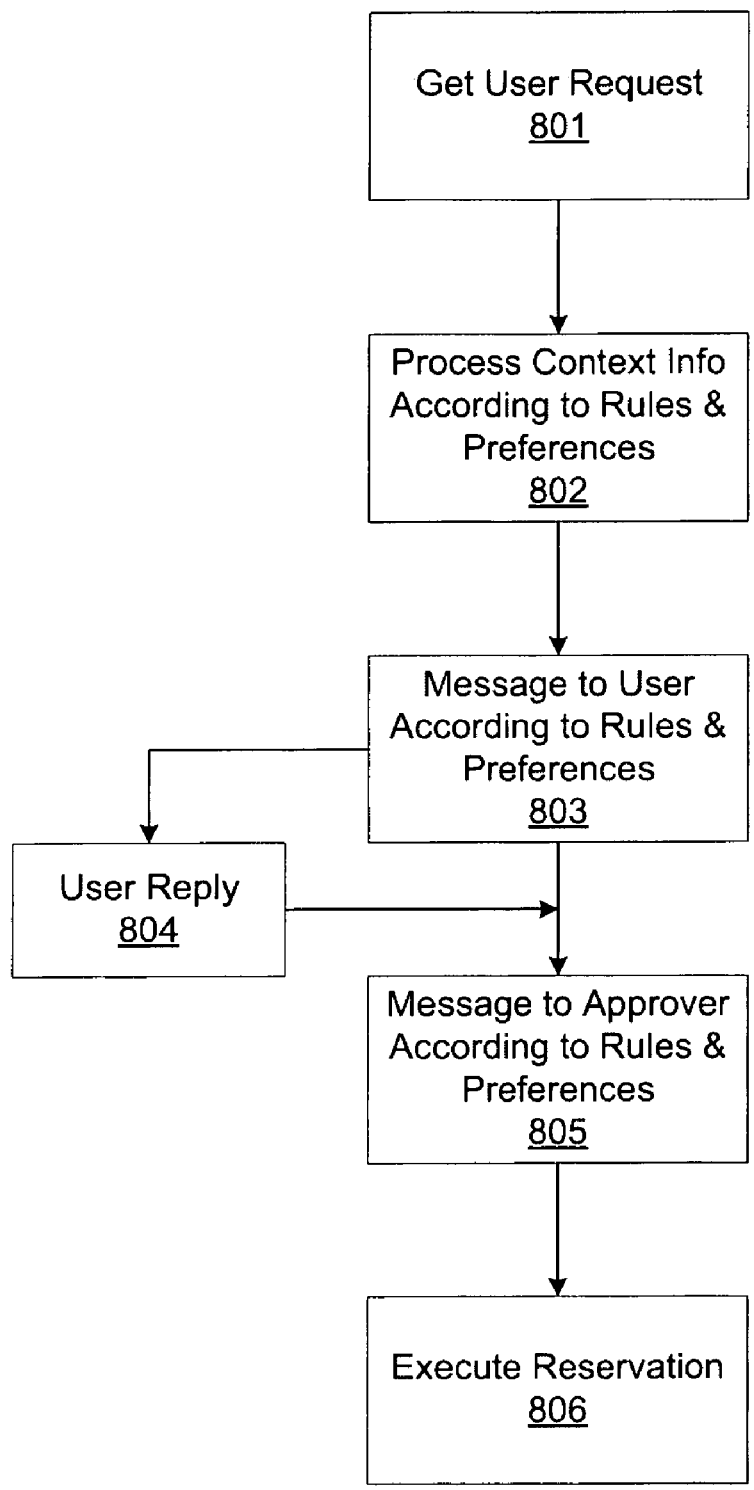
FIG. 8 presents a flow diagram for cost management and optimization, according to the one embodiment.

FIG. 8 shows a flow diagram of a typical procurement process, according to one embodiment. In step 801, a user makes a request. That request is then processed according to the context information rules and preferences in step 802. In some cases, a message may be sent to the user to notify him of this step; while in other cases the user may be asked or told of a variation from his preferences, to which the user must reply. In the example given above of the preference for a Hilton hotel over a Marriott hotel, the user has said that his preference is a Marriott. He may be notified that the Marriott is not available and the system is going to book him into the Hilton, or in other cases the user may be offered a personal incentive, such as a $10 credit at his hotel minibar if he selects a Hilton hotel. The user then sends a reply in step 804 and then the system sends a message in step 805 to the approver that gives not only the decision but also the background information that contributed to this decision. For example, the budget approved for this user, the typical or available budget for this city, the preference of the Hilton over the Marriott due to the contract requirements, etc. It is clear that further additional information may be added to affect the decision, and that steps 803 through 805 may loop back as many times as needed. For example, the user may note that despite the system's preference for the Hilton, the Marriott is within walking distance of the customer, whereas the Hilton is farther away, requiring a taxi ride, as additional message information to the specific approver in this case. Once the approver responds and reaches an accord with the user, a reservation may be executed in step 806 and then in the normal process of the system, both the user and the approver may be notified of the finalization of reservation.

It is clear that many modifications and variations of this embodiment may be made by one skilled in the art without departing from the spirit of the novel art of this disclosure.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

The invention claimed is:

1. A computer-implemented method, the method comprising:
    obtaining, via a computing device, personal preferences of a first end user;
    receiving, via the computing device, a request for procurement of an item from the first end user;
    in response to the request, creating, via the computing device, a set of procurement rules based on at least in part on the personal preferences of the first end user, options previously declined by the first end user, and history of similar requests of the first end user, wherein the first end user is an employee of an organization;
    messaging, via the computing device, the first end user according to the set of procurement rules;
    notifying, via the computing device, the first end user of a variation from the personal preferences;
    providing, via the computing device, an alternative option to the personal preferences that is compliant with the procurement rules;
    offering, via the computing device, a financial incentive to the first end user not to procure a component of the item and instead procure the alternative option; and
    configuring, via the computing device, the procurement rules in accordance with procurement rules selected by at least a majority of other organizations in a predetermined category.

2. The method of claim 1, further comprising receiving, via the computing device, a procurement selection from the first end user in response to the messaging.

3. The method of claim 1, further comprising:
    obtaining, via the computing device, a profile of the first end user; and
    generating, via the computing device, an automated procurement selection based on the profile of the first end user.

4. The method of claim 1, wherein the set of procurement rules is further based on procurement rules of an entity; and the messaging offers the first end user one or more options to modify the request for procurement.

5. The method of claim 4, wherein the set of procurement rules includes contract related rules.

6. The method of claim 1, further comprising:
    sending, via the computing device, an approval request to a second end user for the request of procurement received from the first end user; and
    messaging, via the computing device, the second end user in relation with the approval request according to a set of procurement approval rules.

7. The method of claim 6, further comprising: obtaining, via the computing device, personal preferences of the second end user; wherein the set of procurement approval rules is based on the personal preferences of the second end user.

8. The method of claim 7, wherein the set of procurement approval rules includes contract related rules.

9. The method of claim 7, further comprising receiving, via the computing device, approval of the request of procurement from the second end user.

10. The method of claim 9, further comprising initiating, via the computing device, a process for execution of procurement contracts in response to the approval from the second end user.

11. The method of claim 9, further comprising executing, via the computing device, one or more procurement contracts after the approval from the second end user.

12. The method of claim 11, further comprising sending, via the computing device, both the first and the second end user notification of procurement.

13. The method of claim 1, wherein the request for procurement is to identify qualified service providers or service types.

14. The method of claim 1, wherein the request for procurement is related to travel reservations or services.

15. The method of claim 1, wherein the set of procurement rules is related to cost management optimization.

16. The method of claim 1, wherein the messaging is based on the identity of the first end user.

17. The method of claim 1, wherein the messaging is place name or date and time sensitive.

18. The method of claim 1, further comprising receiving, via the computing device, a reply from the first end user in response to the messaging.

19. The method of claim 18, further comprising:
    repeating providing, via the computing device, the messaging to the first end user according to the set of procurement rules; and
    receiving, via the computing device, the reply from the first end user in response to the messaging until a procurement selection from the first end user is received.

20. The method of claim 6, further comprising receiving, via the computing device, a reply from the second end user in response to an authorization messaging.

21. The method of claim 20, further comprising:
repeating providing, via the computing device, the authorization messaging to the second end user according to the set of approval procurement rules; and
receiving, via the computing device, the reply from the second end user in response to the authorization messaging until an authorization acceptance or decline from the second end user is received.

22. A machine-readable medium having stored thereon a set of instructions, the instructions causing a data processing system to perform a method comprising:
obtaining personal preferences of a first end user;
receiving a request for procurement of an item from the first end user;
in response to the request, creating a set of procurement rules based at least in part on the personal preferences of the first end user, options previously declined by the first end user, and history of similar requests of the first end user, wherein the first end user is an employee of an organization;
messaging the first end user according to the set of procurement rules;
notifying the first end user of a variation from the personal preferences;
providing an alternative option to the personal preferences that is compliant with the procurement rules;
offering a financial incentive to the first end user not to procure a component of the item and instead procure the alternative option; and
configuring the procurement rules in accordance with procurement rules selected by at least a majority of other organizations in a predetermined category.

23. A computer data processing system comprising:
at least one server for:
storing personal preferences of a first end user;
receiving a request for procurement of an item from the first end user;
in response to the request, creating a set of procurement rules based at least in part on the personal preferences of the first end user, options previously declined by the first end user, and history of similar requests of the first end user, wherein the first end user is an employee of an organization;
messaging the first end user according to the set of procurement rules;
notifying the first end user of a variation from the personal preferences;
providing an alternative option to the personal preferences that is compliant with the procurement rules,
offering a financial incentive to the first end user not to procure a component of the item and instead procure the alternative option; and
configuring the procurement rules in accordance with procurement rules selected by at least a majority of other organizations in a predetermined category.

* * * * *